United States Patent
Chen (10) Patent No.: US 11,041,121 B2
(45) Date of Patent: Jun. 22, 2021

(54) QUANTUM DOTS PREPARATION METHOD AND QUANTUM DOTS

(71) Applicant: WUHAN CHINA STAR OPTOELECTRONICS SEMICONDUCTOR DISPLAY TECHNOLOGY CO., LTD., Hubei (CN)

(72) Inventor: Xu Chen, Wuhan (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 287 days.

(21) Appl. No.: 16/326,212

(22) PCT Filed: Jan. 17, 2019

(86) PCT No.: PCT/CN2019/072109
§ 371 (c)(1),
(2) Date: Feb. 17, 2019

(87) PCT Pub. No.: WO2020/077905
PCT Pub. Date: Apr. 23, 2020

(65) Prior Publication Data
US 2020/0115629 A1 Apr. 16, 2020

(51) Int. Cl.
*C09K 11/66* (2006.01)
*C09K 11/02* (2006.01)
*B82Y 40/00* (2011.01)

(52) U.S. Cl.
CPC .......... *C09K 11/664* (2013.01); *C09K 11/025* (2013.01); *B82Y 40/00* (2013.01)

(58) Field of Classification Search
CPC ............................ C09K 11/664; B82Y 40/00
See application file for complete search history.

(56) References Cited

FOREIGN PATENT DOCUMENTS

| CN | 106753358 | * | 5/2017 |
| CN | 108865126 | * | 11/2018 |
| WO | WO 2019099657 | * | 5/2019 |

OTHER PUBLICATIONS

Translation for CN 106753358, May 31, 2017.*
Translation for CN 108865126, Nov. 23, 2018.*
Chen et al, "Silioca Coated Mn-Doped CsPb(Cl/Br)3 Inorganic Perovskite Quantum Dots:Exciton-to-Mn Energy Transfer and Blue-Excitable Solid-State Lighting", Applied Materiasls & Interfaces, 2017, 9, p. 40477-40487, Nov. 1, 2017.*

* cited by examiner

*Primary Examiner* — C Melissa Koslow
(74) *Attorney, Agent, or Firm* — Mark M. Friedman (57) ABSTRACT

A method of preparing quantum dots and the quantum dots are provided. The quantum dots are doped with manganese ions and various kinds of halogen ions such that when the quantum dots emit light, they will have a dual luminescence system, one is intrinsic luminescence of perovskite quantum dots and the other is doping luminescence of the manganese ions. The intrinsic luminescence of perovskite is adjustable from 410 nm to 520 nm based on the ratio of the amounts of different substances having various halide ions, which increases the wavelength range of a quantum dot luminescence spectrum so that the application scenario of the quantum dots is wider.

18 Claims, 5 Drawing Sheets

QUANTUM DOTS PREPARATION METHOD AND QUANTUM DOTS

FIELD OF INVENTION

The present application relates to the field of photoelectron material preparation technology, and in particular, to a quantum dots preparation method and quantum dots.

BACKGROUND OF INVENTION

Quantum dot technology was recognized by the market and rapidly developed due to its excellent thermal stability, high quantum efficiency, narrow peak width at half height, and high color gamut characteristics.

Technical Problem

Figure 1:
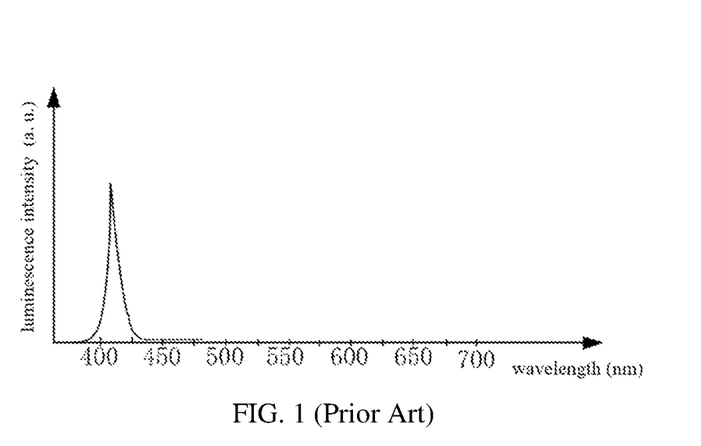
FIG. 1 is a schematic diagram showing a luminescence spectrum of a conventional quantum dot.

However, existing quantum dots, as shown in FIG. 1, such as perovskite quantum dots $CsPbCl_3$, etc., the intrinsic luminescence of perovskite has a wavelength between 400 nm and 420 nm, a wavelength range of a luminescence spectrum is narrow. That is, the existing quantum dots have a technical problem that the luminescence spectrum has a narrow wavelength range.

Technical Solution

The present application provides a quantum dots preparation method and the quantum dot to solve the technical problem that the luminescence spectrum has a narrow wavelength range.

To solve the above problems, the technical solution provided by the present application is as follows:

An embodiment of the present application provides a method for preparing quantum dot, which includes the following steps:

step 1, mixing a first lead halide with a surfactant, a cosolvent, and a non-polar solution to obtain a first mixture, and heating the first mixture to obtain a first lead halide solution;

step 2, mixing a cesium salt with an octadecene and oleic acid to obtain a second mixture, and heating the second mixture to obtain a cesium oleate solution;

step 3, mixing the first lead halide solution with a manganese halide to obtain a third mixture and heating the third mixture to a first preset temperature, adding the cesium oleate solution to the third mixture, after a predetermined period of time, quenching the third mixture to a second preset temperature, and thereafter centrifuging and precipitating the third mixture until intermediate quantum dots are dispersed in the non-polar solution, thereby to obtain an intermediate quantum dot non-polar solution; and step 4, adding a second lead halide to the intermediate quantum dot non-polar solution to obtain the target quantum dots, wherein halide ions contained in the second lead halide are different from halide ions contained in the first lead halide.

In the quantum dots preparing method of the present application, the target quantum dots include at least one of $Mn:CsPbX_3$, $Mn:CsPb_2X_5$, and $Mn:Cs_4PbX_6$, wherein X is at least one of chlorine element, bromine element, and iodine element.

In the quantum dots preparation method of the present application, the halide ions of the manganese halide are the same as halide ions of the first lead halide.

In the quantum dots preparation method of the present application, the cesium salt includes at least one of cesium acetate, cesium carbonate, cesium nitrate, and cesium sulfate.

In the quantum dots preparation method of the present application, the surfactant includes at least one of oleylamine, laurylamine, octylamine, and hexylamine.

In the quantum dots preparation method of the present application, the cosolvent includes at least one of oleic acid, lauric acid, caprylic acid, caproic acid, acetic acid or methacrylic acid.

In the quantum dots preparation method of the present application, the non-polar solution includes at least one of dodecane and octadecene.

In the quantum dots preparation method of the present application, the step 2 and step 3 are performed under a vacuum condition.

In the quantum dots preparation method of the present application, the first preset temperature is 180° C., the predetermined period of time is 5 seconds, and the second preset temperature is room temperature.

In the quantum dots preparation method of the present application, the first lead halide in step 1 is in a form of a solution.

In the quantum dots preparation method of the present application, the manganese halide in step 3 is in a form of a solid.

In the quantum dots preparation method of the present application, the second lead halide in step 4 is in a form of a solution.

In the quantum dots preparation method of the present application, the first lead halide is $PbCl_2$, the manganese halide is $MnCl_2$, and the second lead halide is $PbBr_2$.

In the quantum dots preparation method of the present application, the first lead halide is $PbBr_2$, the manganese halide is $MnBr_2$, and the second lead halide is $PbCl_2$.

In the quantum dots preparation method of the present application, the first lead halide is $PbCl_2$, the manganese halide is $MnCl_2$, and the second lead halide is $PbI_2$.

In the quantum dots preparation method of the present application, the first lead halide is $PbI_2$, the manganese halide is $MnI_2$, and the second lead halide is $PbCl_2$.

In the quantum dots preparation method of the present application, the first lead halide is $PbBr_2$, the manganese halide is $MnBr_2$, and the second lead halide is $PbI_2$.

In the quantum dots preparation method of the present application, the first lead halide is $PbI_2$, the manganese halide is $MnI_2$, and the second lead halide is $PbBr_2$.

In the quantum dots preparation method of the present application, the first lead halide is $PbCl_2$, the manganese halide is $MnCl_2$, and the second lead halide is a mixed solution of $PbBr_2$ and $PbI_2$.

Meanwhile, the embodiment of the present application provides a quantum dot, the quantum is a target quantum dot obtained by the quantum dots preparation method provided by the present application.

Beneficial Effect

The beneficial effects of the application are:
the present application provides a new quantum dot and a corresponding quantum dots preparation method. The quantum dots are doped with manganese ions and various kinds of halide ions such that when the quantum dots emit light, they will have a dual luminescence system, one is intrinsic luminescence of a perovskite quantum dot and the other is doping luminescence of manganese ion.

The ratio of amounts of the different substances based on various halide ions allows the perovskite intrinsic luminescence adjustable from 410 nm to 520 nm, it solves the technical problem that the conventional quantum dot has a narrow wavelength range of the luminescence spectrum, and it increases the wavelength range of the quantum dot luminescence spectrum so that the application scenario of the quantum dot is wider.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

DETAILED DESCRIPTION OF PREFERRED EMBODIMENTS

The following description of the various embodiments is provided to illustrate the specific embodiments of the invention. The directional terms mentioned in the present invention, such as "on," "below", "front", "behind", "left", "right", "inside", "outside", "side", etc., are merely references of the direction in the drawings. Therefore, the directional terminology used is for the purpose of illustration and understanding of the invention rather than limiting the invention. In the drawings, the structurally similar elements are denoted by the same reference numerals.

The present application can solve the technical problem that the existing quantum dots having a narrow wavelength range of a luminescence spectrum. (as shown in FIG. 1)

The present application provides a dual luminescence system of a manganese doped perovskite quantum dot by an ion doping method, one is intrinsic luminescence of perovskite quantum dots and the other is doping luminescence of manganese ions. We added a $PbBr_2$ or $PbI_2$ solution to a synthesized $Mn:CsPbCl_3$, and successfully prepared $Mn:CsPbBr_3$ or $Mn:CsPbI_3$ particles by an ion exchange. By the ion exchange, we achieved intrinsic luminescence of perovskite adjustable from 410 to 480 nm, while the doping luminescence of manganese ion is maintained at 585 nm. By changing the amounts of the manganese ions added, a change in intensity of manganese ion doped luminescence can be achieved.

Figure 2:
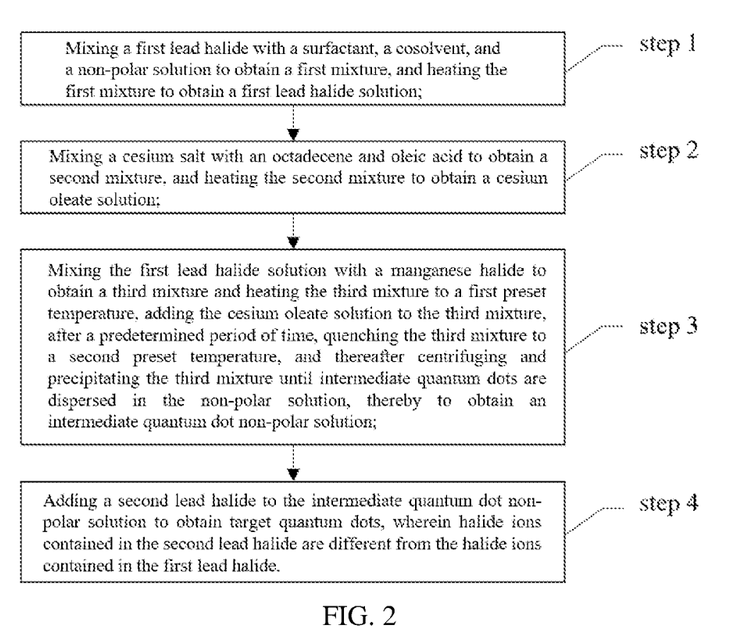
FIG. 2 is a flow chart of a method for preparing a quantum dot provided by the present application.

As shown in FIG. 2, the quantum dots preparation method provided by the present application includes the following steps:

step 1, mixing a first lead halide with a surfactant, a cosolvent, and a non-polar solution to obtain a first mixture, and heating the first mixture to obtain a first lead halide solution;

step 2, mixing a cesium salt with an octadecene and oleic acid to obtain a second mixture, and heating the second mixture to obtain a cesium oleate solution;

step 3, mixing the first lead halide solution with a manganese halide to obtain a third mixture and heating the third mixture to a first preset temperature, adding the cesium oleate solution to the third mixture, after a predetermined period of time, quenching the third mixture to a second preset temperature, and thereafter centrifuging and precipitating the third mixture until intermediate quantum dots are dispersed in the non-polar solution, thereby to obtain an intermediate quantum dot non-polar solution; and step 4, adding a second lead halide to the intermediate quantum dot non-polar solution to obtain the target quantum dots, wherein halide ions contained in the second lead halide are different from halide ions contained in the first lead halide.

In one embodiment, the target quantum dot includes at least one of $Mn:CsPbX_3$, $Mn:CsPb_2X_5$, and $Mn:Cs_4PbX_6$, and X is at least one of a chlorine element, a bromine element, and an iodine element.

In one embodiment, the halide ions of the manganese halide are the same as halide ions of the first lead halide.

In one embodiment, the onium salt includes at least one of cesium acetate, cesium carbonate, cesium nitrate, and cesium sulfate.

In one embodiment, the surfactant includes at least one of oleylamine, laurylamine, octylamine, and hexylamine.

In one embodiment, the cosolvent includes at least one of oleic acid, lauric acid, caprylic acid, caproic acid, acetic acid or methacrylic acid.

In one embodiment, a non-polar solution includes at least one of dodecane and octadecene.

In one embodiment, steps 2 and 3 are performed under a vacuum condition to ensure that the liquid does not volatilize into the air under a high temperature conditions and thus does not contaminate the air.

In one embodiment, the first preset temperature is 180° C., the predetermined period of time is 5 seconds, and the second preset temperature is room temperature.

In one embodiment, the first lead halide in step 1 is in the form of a solution.

In one embodiment, the manganese halide in step 3 is in a form of a solid.

In one embodiment, the second lead halide in step 4 is in the form of a solution.

In one embodiment, the first lead halide is $PbCl_2$, the manganese halide is $MnCl_2$, and the second lead halide is $PbBr_2$. In the above condition, the quantum dots preparation method provided by the present application is:

Mixing a certain amount (0.2 mmol) of a $PbCl_2$ solution with 0.5 ml of oleic acid, 0.5 ml of oleylamine, and 3 ml of a non-polar alkyl solution (such as dodecane, octadecene, etc.) until the solids are all dissolved, and finally obtaining a backup oleylamine/oleic acid coordination solution. The concentration of lead halide is adjustable.

Taking 0.65 g of $Cs_2CO_3$, 2.5 ml of oleic acid (OA) and 18 ml of an octadecene (ODE) solution to mix under a vacuum condition, and heating them at 120-150° C. until the solids are completely dissolved, and finally obtaining a cesium oleate solution. The concentration of cesium oleate and the heating temperature are adjustable.

Figure 3:
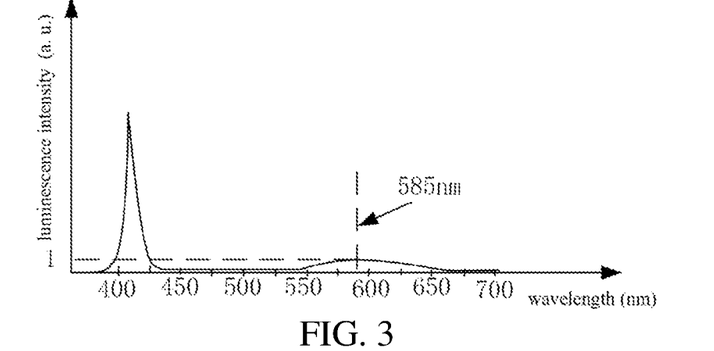
FIG. 3 is a schematic diagram of a luminescence spectrum of a first quantum dot provided by the present application.
Figure 4:
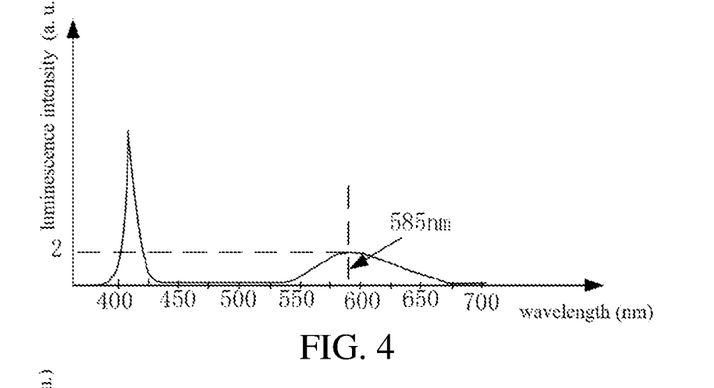
FIG. 4 is a schematic diagram of a luminescence spectrum of a second quantum dot provided by the present application.
Figure 5:
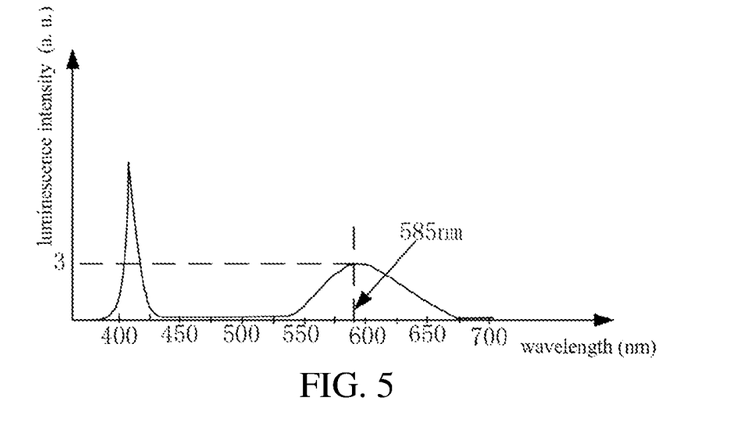
FIG. 5 is a schematic diagram of a luminescence spectrum of a third quantum dot provided by the present application.

Taking the $PbCl_2$ solution prepared above, adding a certain amount (such as 0.08 mmol) of $MnCl_2$ solid thereto. Heating and stirring the solution under a vacuum condition until the $MnCl_2$ solids are completely solved, next the solution is heated to 180° C. and adding 0.2 ml of the cesium oleate solution thereto, and after 5 seconds, the solution is quenched to room temperature, following the solution is centrifuged and separated, and finally obtaining square $Mn:CsPbCl_3$ particles of about 10 nm. As shown in FIG. 3 to FIG. 5, the particles have two emission peaks at 410 nm and 585 nm. By changing a feed ratio of $MnCl_2$ to $PbCl_2$, particles with different doping concentrations can be obtained. Further, the quantum dots of different luminescence systems can be obtained.

Under normal temperature and pressure, a $PbBr_2$ solution was added dropwise to the synthesized $Mn:CsPbCl_3$ particles non-polar solution, and finally a solution containing $Mn:CsPbCl_3$ particles and $Mn:CsPbBr_3$ particles can be obtained.

As shown in FIG. 6 to FIG. 12, various molar ratios of $Mn:CsPbCl_3$ particles to $Mn:CsPbBr_3$ particles each corresponds to its intrinsic luminescence respectively, thereby the intrinsic luminescence of perovskite can be adjusted from 410 nm to 520 nm. The position of manganese ion doped luminescence is unchanged.

By an ion exchange, the present application can obtain a series of a dual luminescence system composed of various wavelengths.

Specifically, when the molar ratio of $Mn:CsPbBr_3$ particles to $Mn:CsPbCl_3$ particles (Br/Cl) fixed at 0.05, different doping concentrations of the manganese ions will result in different doping luminescence intensity peaks.

As shown in FIG. 3, when the doping concentration of the manganese ions is 20%, a luminescence intensity peak appears at 585 nm, and the luminescence intensity peak corresponds to luminance of 1 (a.u.).

As shown in FIG. 4, when the doping concentration of the manganese ions is 40%, a luminescence intensity peak appears at 585 nm, and the luminescence intensity peak corresponds to luminance of 2 (a.u.).

As shown in FIG. 5, when the doping concentration of the manganese ions is 60%, a luminescence intensity peak appears at 585 nm, and the luminescence intensity peak corresponds to luminance of 3 (a.u.).

Specifically, when the doping concentration of the manganese ions fixed at 20%, the molar ratio of $Mn:CsPbBr_3$ particles to $Mn:CsPbCl_3$ particles (Br/Cl) varies, the luminescence intensity peak of the intrinsic luminescence of perovskite varies accordingly.

Figure 6:
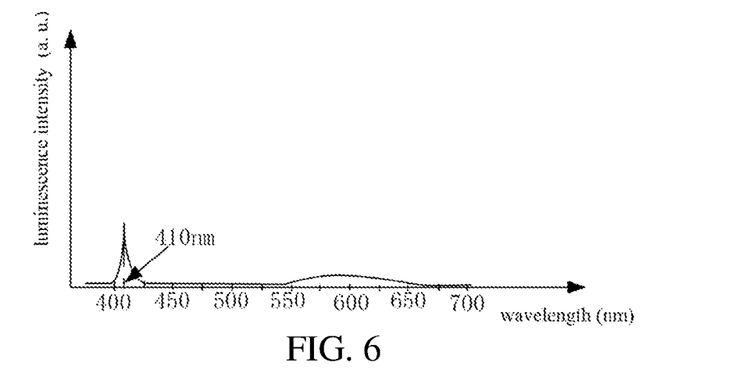
FIG. 6 is a schematic diagram of a luminescence spectrum of a fourth quantum dot provided by the present application.

As shown in FIG. 6, when the molar ratio of $Mn:CsPbBr_3$ particles to $Mn:CsPbCl_3$ particles (Br/Cl) is 0.05, the luminescence intensity peak of the perovskite intrinsic luminescence corresponds to wavelength of 410 nm.

Figure 7:
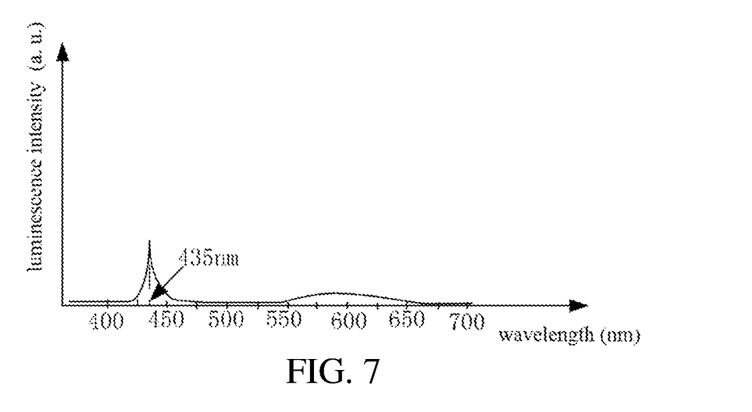
FIG. 7 is a schematic diagram of a luminescence spectrum of a fifth quantum dot provided by the present application.

As shown in FIG. 7, when the molar ratio of $Mn:CsPbBr_3$ particles to $Mn:CsPbCl_3$ particles (Br/Cl) is 0.17, the luminescence intensity peak of the perovskite intrinsic luminescence corresponds to wavelength of 435 nm.

Figure 8:
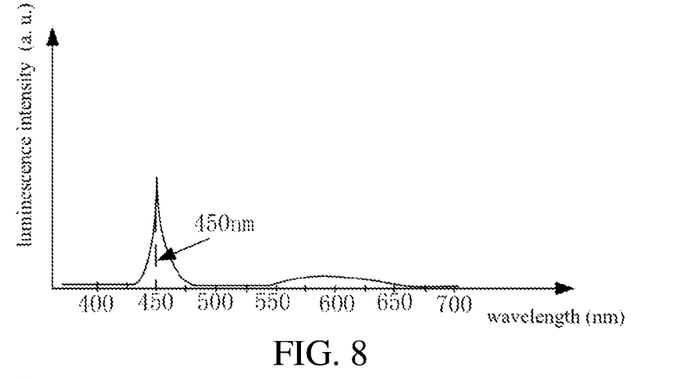
FIG. 8 is a schematic diagram of a luminescence spectrum of a sixth quantum dot provided by the present application.

As shown in FIG. 8, when the molar ratio of $Mn:CsPbBr_3$ particles to $Mn:CsPbCl_3$ particles (Br/Cl) is 0.33, the luminescence intensity peak of the perovskite intrinsic luminescence corresponds to wavelength of 450 nm.

Figure 9:
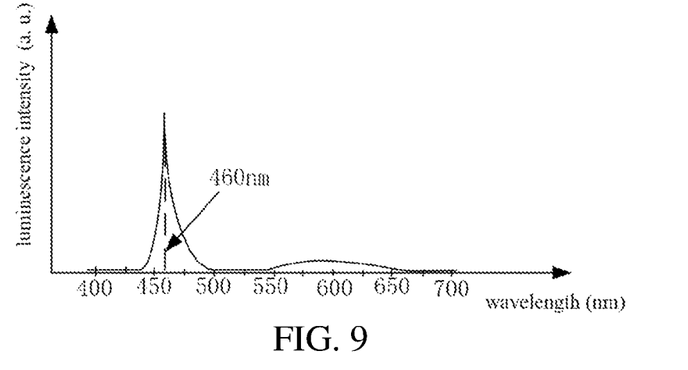
FIG. 9 is a schematic diagram of a luminescence spectrum of a seventh quantum dot provided by the present application.
Figure 10:
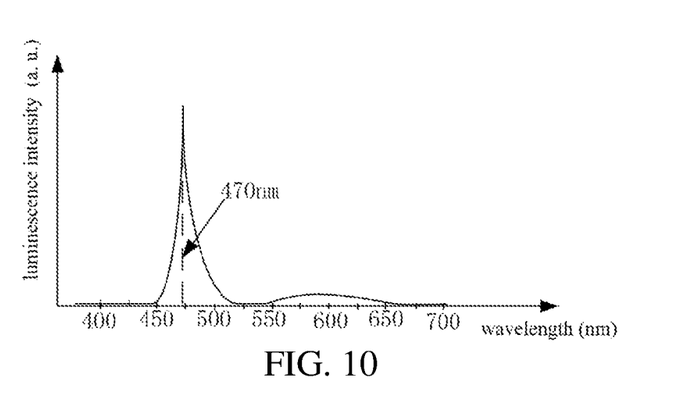
FIG. 10 is a schematic diagram of a luminescence spectrum of an eighth quantum dot provided by the present application.
Figure 11:
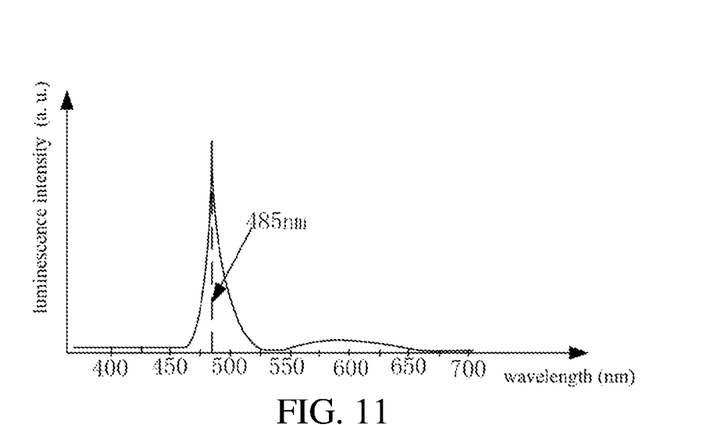
FIG. 11 is a schematic diagram of a luminescence spectrum of a ninth quantum dot provided by the present application.
Figure 12:
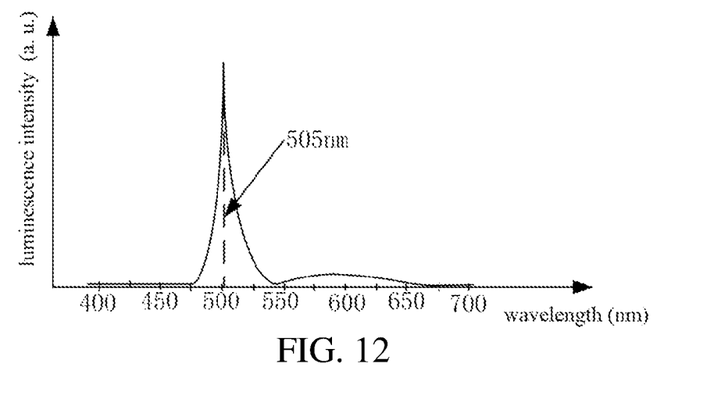
FIG. 12 is a schematic diagram of a luminescence spectrum of a tenth quantum dot provided by the present application.

As shown in FIG. 9, when the molar ratio of $Mn:CsPbBr_3$ particles to $Mn:CsPbCl_3$ particles (Br/Cl) is 0.50, the luminescence intensity peak of the intrinsic luminescence of the perovskite corresponds to wavelength of 460 nm;

As shown in FIG. 10, when the molar ratio of $Mn:CsPbBr_3$ particles to $Mn:CsPbCl_3$ particles (Br/Cl) is 0.67, the luminescence intensity peak of the perovskite intrinsic luminescence corresponds to wavelength of 470 nm;

As shown in FIG. 11, when the molar ratio of $Mn:CsPbBr_3$ particles to $Mn:CsPbCl_3$ particles (Br/Cl) is 0.83, the luminescence intensity peak of the perovskite intrinsic luminescence corresponds to wavelength of 485 nm;

As shown in FIG. 12, when the molar ratio of $Mn:CsPbBr_3$ particles to $Mn:CsPbCl_3$ particles (Br/Cl) is 1.00, the peak luminance of the perovskite intrinsic luminescence corresponds to wavelength of 505 nm.

In one embodiment, the first lead halide is $PbBr_2$, the manganese halide is $MnBr_2$, and the second lead halide is $PbCl_2$. In the above condition, the quantum dots preparation method provided by the present application is:

Mixing a certain amount (0.2 mmol) of $PbBr_2$ solution with 0.5 ml of oleic acid, 0.5 ml of oleylamine, and 3 ml of a non-polar alkyl solution (such as dodecane, octadecene, etc.), following heating the solution until the solids were all dissolved, and finally obtaining a backup oleylamine/oleic acid coordination solution having lead halides different from above. The concentration of lead halide is adjustable.

Taking 0.65 g of $Cs_2CO_3$, 2.5 ml of oleic acid (OA) and 18 ml of the octadecene (ODE) solution to mix under vacuum condition, and heating the solution at 120-150° C. until the solids were completely dissolved, finally obtaining a cesium oleate solution. The concentration of cesium oleate and the heating temperature are adjustable.

Taking the $PbBr_2$ solution prepared above, adding a certain amount (such as 0.08 mmol) of $MnBr_2$ solid thereto. Heating and stirring the solution under a vacuum condition until the $MnBr_2$ solids were completely solved, next the solution is heated to 180° C. and adding 0.2 ml of the cesium oleate solution thereto, and after 5 seconds, the solution is quenched to room temperature, following the solution is centrifuged and separated and finally obtaining square $Mn:CsPbBr_3$ particles of about 10 nm.

Under a normal temperature and pressure, the $PbCl_2$ solution is added dropwise to the synthesized $Mn:CsPbBr_3$ particles non-polar solution, and finally $Mn:CsPbCl_3$ particles and $Mn:CsPbBr_3$ particles can be obtained.

In one embodiment, the first lead halide is $PbCl_2$, the manganese halide is $MnCl_2$, and the second lead halide is $PbI_2$.

In the above condition, the quantum dots preparation method provided by the present application is:

Mixing a certain amount (0.2 mmol) of the $PbCl_2$ solution with 0.5 ml of oleic acid, 0.5 ml of oleylamine, and 3 ml of a non-polar alkyl solution (such as dodecane, octadecene, etc.), following heating the solution until the solids are all dissolved, and finally obtaining a backup oleylamine/oleic acid coordination solution having lead halides different from above. The concentration of lead halide is adjustable.

Taking 0.65 g of $Cs_2CO_3$, 2.5 ml of oleic acid (OA) and 18 ml of the octadecene (ODE) solution to mix under vacuum condition, and heating the solution at 120-150° C. until the solids are completely dissolved, finally obtaining a cesium oleate solution. The concentration of cesium oleate and the heating temperature are adjustable.

Taking the $PbCl_2$ solution prepared above, adding a certain amount (such as 0.08 mmol) of $MnCl_2$ solid thereto. Heating and stirring the solution under a vacuum condition until the $MnCl_2$ solids were completely solved, next the solution is heated to 180° C. and adding 0.2 ml of the cesium oleate solution thereto, and after 5 seconds, the solution is quenched to room temperature, following the solution is centrifuged and separated and finally obtaining square $Mn:CsPbCl_3$ particles of about 10 nm.

Under a normal temperature and pressure, a $PbI_2$ solution is added dropwise to the synthesized $Mn:CsPbCl_3$ particles non-polar solution, and finally $Mn:CsPbCl_3$ particles and $Mn:CsPbI_3$ particles can be obtained.

In one embodiment, the first lead halide is $PbI_2$, the manganese halide is $MnI_2$, and the second lead halide is $PbCl_2$. In the above condition, the quantum dots preparation method provided by the present application is:

Mixing a certain amount (0.2 mmol) of $PbI_2$ solution with 0.5 ml of oleic acid, 0.5 ml of oleylamine, and 3 ml of a non-polar alkyl solution (such as dodecane, octadecene, etc.), following heating the solution until the solids were all dissolved, and finally obtaining a backup oleylamine/oleic acid coordination solution having lead halides different from above. The concentration of lead halide is adjustable.

Taking 0.65 g of $Cs_2CO_3$, 2.5 ml of oleic acid (OA) and 18 ml of the octadecene (ODE) solution to mix under vacuum condition, and heating the solution at 120-150° C. until the solids are completely dissolved, finally obtaining a cesium oleate solution. The concentration of cesium oleate and the heating temperature are adjustable.

Taking the $PbI_2$ solution prepared above, adding a certain amount (such as 0.08 mmol) of $MnI_2$ solid thereto. Heating and stirring the solution under a vacuum condition until the $MnI_2$ solids were completely solved, next the solution is heated to 180° C. and adding 0.2 ml of the cesium oleate solution thereto, and after 5 seconds, the solution is quenched to room temperature, following the solution is centrifuged and separated and finally obtaining square $Mn:CsPbI_3$ particles of about 10 nm.

Under a normal temperature and pressure, a $PbCl_2$ solution is added dropwise to the synthesized $Mn:CsPbI_3$ particles non-polar solution, and finally $Mn:CsPbCl_3$ particles and $Mn:CsPbI_3$ particles can be obtained.

In one embodiment, the first lead halide is $PbBr_2$, the manganese halide is $MnBr_2$, and the second lead halide is $PbI_2$. In the above condition, the quantum dots preparation method provided by the present application is:

Mixing a certain amount (0.2 mmol) of a $PbBr_2$ solution with 0.5 ml of oleic acid, 0.5 ml of oleylamine, and 3 ml of a non-polar alkyl solution (such as dodecane, octadecene, etc.), following heating the solution until the solids were all dissolved, and finally obtaining a backup oleylamine/oleic acid coordination solution having lead halides different from above. The concentration of lead halide is adjustable.

Taking 0.65 g of $Cs_2CO_3$, 2.5 ml of oleic acid (OA) and 18 ml of the octadecene (ODE) solution to mix under vacuum condition, and heating the solution at 120-150° C. until the solids are completely dissolved, finally obtaining a cesium oleate solution. The concentration of cesium oleate and the heating temperature are adjustable.

Taking the $PbCl_2$ solution prepared above, adding a certain amount (such as 0.08 mmol) of $MnBr_2$ solid thereto. Heating and stirring the solution under a vacuum condition until the $MnBr_2$ solids were completely solved, next the solution is heated to 180° C. and adding 0.2 ml of the cesium oleate solution thereto, and after 5 seconds, the solution is quenched to room temperature, following the solution is centrifuged and separated and finally obtaining square $Mn:CsPbBr_3$ particles of about 10 nm.

Under a normal temperature and pressure, a $PbI_2$ solution is added dropwise to the synthesized $Mn:CsPbBr_3$ particles non-polar solution, and finally $Mn:CsPbBr_3$ particles and $Mn:CsPbI_3$ particles can be obtained.

In one embodiment, the first lead halide is $PbI_2$, the manganese halide is $MnI_2$, and the second lead halide is $PbBr_2$. In the above condition, the quantum dots preparation method provided by the present application is:

Mixing a certain amount (0.2 mmol) of the $PbI_2$ solution with 0.5 ml of oleic acid, 0.5 ml of oleylamine, and 3 ml of a non-polar alkyl solution (such as dodecane, octadecene, etc.), following heating the solution until the solids were all dissolved, and finally obtaining a backup oleylamine/oleic acid coordination solution having lead halides different from above. The concentration of lead halide is adjustable.

Taking 0.65 g of $Cs_2CO_3$, 2.5 ml of oleic acid (OA), and 18 ml of the octadecene (ODE) solution to mix under a vacuum condition, and heating the solution at 120-150° C. until the solids are completely dissolved, finally obtaining a cesium oleate solution. The concentration of cesium oleate and the heating temperature are adjustable.

Taking the $PbI_2$ solution prepared above, adding a certain amount (such as 0.08 mmol) of $MnBr_2$ solid thereto. Heating and stirring the solution under a vacuum condition until the $MnI_2$ solids were completely solved, next the solution is heated to 180° C. and adding 0.2 ml of cesium oleate solution thereto, and after 5 seconds, the solution is quenched to room temperature, following the solution is centrifuged and separated and finally obtaining square $Mn:CsPbI_3$ particles of about 10 nm.

Under a normal temperature and pressure, the $PbBr_2$ solution is added dropwise to the synthesized $Mn:CsPbI_3$ particles non-polar solution, and finally $Mn:CsPbBr_3$ particles and $Mn:CsPbI_3$ particles can be obtained.

In one embodiment, the first lead halide is $PbCl_2$, the manganese halide is $MnCl_2$, and the second lead halide is a mixed solution of $PbBr_2$ and $PbI_2$. In the above condition, the quantum dots preparation method provided by the present application is:

Mixing a certain amount (0.2 mmol) of the $PbCl_2$ solution with 0.5 ml of oleic acid, 0.5 ml of oleylamine, and 3 ml of a non-polar alkyl solution (such as dodecane, octadecene, etc.), following heating the solution until the solids were all dissolved, and finally obtaining a backup oleylamine/oleic acid coordination solution having lead halide different from above. The concentration of lead halide is adjustable.

Taking 0.65 g of $Cs_2CO_3$, 2.5 ml of oleic acid (OA) and 18 ml of the octadecene (ODE) solution to mix under a vacuum condition, and heating the solution at 120-150° C. until the solids are completely dissolved, finally obtaining a cesium oleate solution. The concentration of cesium oleate and the heating temperature are adjustable.

Taking the $PbCl_2$ solution prepared above, adding a certain amount (such as 0.08 mmol) of $MnCl_2$ solid thereto. Heating and stirring the solution under a vacuum condition until the $MnCl_2$ solids were completely solved, next the solution is heated to 180° C. and adding 0.2 ml of the cesium oleate solution thereto, and after 5 seconds, the solution is quenched to room temperature, following the solution is centrifuged and separated and finally obtaining square Mn:$CsPbCl_3$ particles of about 10 nm.

Under a normal temperature and pressure, the $PbBr_2$ and $PbI_2$ solutions were added dropwise to the synthesized Mn:$CsPbCl_3$ particles non-polar solution, and finally Mn:$CsPbCl_3$ particles, Mn:$CsPbBr_3$ particles and Mn:$CsPbI_3$ particles can be obtained.

Meanwhile, the embodiment of the present application provides a plurality of quantum dots, the quantum dots is at least one of the target quantum dots obtained by the method of preparing the quantum dots according to the present application.

The quantum dots are doped with manganese ions and various kinds of halogen ions such that when the quantum dots emit light, they will have a dual luminescence system, one is intrinsic luminescence of perovskite quantum dots and the other is doping luminescence of manganese ions.

The intrinsic luminescence of perovskite is adjustable from 410 nm to 520 nm based on the ratio of the amounts of different substances having various halide ions.

Meanwhile, the embodiment of the present application provides a display device, such as a light-emitting diode (LED) device or the like, which uses the quantum dots obtained by the invention.

Meanwhile, in order to enhance the stability of quantum dot luminescence, the present application includes the following steps when preparing a quantum dots device:

Step 5, mixing the target quantum dots solution obtained in step 4 with a polydimethylsiloxane (PDMS) solution, and stirring to obtain a uniformly mixed solution. The volume ratio of the target quantum dots solution to the PDMS solution is preferably 1:(1-2). The concentration of the target quantum dots solution is preferably 25 mg/ml. The concentration of the PDMS solution is preferably 10 mg/ml.

Step 6, the mixed solution obtained in step 5 is applied onto a silicon substrate, dried naturally in the air, or placed in an oven at 50° C. for 30 minutes to form a film. The film is placed in a vacuum apparatus for continuous variable temperature heat treatment and conventional annealing heat treatment to obtain a heat-treated sample, and the heat-treated sample is subjected to a luminescence heat stability test.

The temperature range in the variable temperature heat treatment is preferably from 20° C. to 140° C. The treatment time is preferably from 10 min to 2 h.

The annealing heat treatment temperature can be selected to be 60° C., 80° C., and 100° C., and the treatment time is for 10 minutes respectively. The vacuum apparatus is preferably a cryogenic storage Dewar.

The present invention effectively improves the thermal stability of the quantum dots by embedding the quantum dots in the PDMS.

The doping of the manganese ions increases the stability of the crystal, and besides, the use of a PDMS coating agent can significantly inhibit a surface ligand of quantum dots from shedding and inhibit the agglomeration and growth of quantum dots.

Specifically, the organic chain of PDMS interacts with the ligand on a surface of the quantum dots to isolate the quantum dots and prevent the polymerization and growth of quantum dots at higher temperatures, meanwhile, the interaction between them can also protect the surface ligand, prevent it from falling off, reduce the surface defect state, and its luminescence stability will be enhanced, thereby improving its luminescent thermal stability.

According to the above embodiment, it can be known that the present application provides the quantum dots preparation method and the quantum dots, the quantum dots are doped with the manganese ions and various kinds of the halogen ions such that when the quantum dots emit light, they will have the dual luminescence system, one is intrinsic luminescence of the perovskite quantum dots and the other one is doping luminescence of the manganese ions. The intrinsic luminescence of perovskite is adjustable from 410 nm to 520 nm based on the ratio of the amounts of different substances having various halide ions, which increases the wavelength range of the quantum dots luminescence spectrum so that the application scenario of the quantum dots is wider.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A method of preparing quantum dots, comprising steps of:
    step 1, mixing a first lead halide with a surfactant, a cosolvent, and a non-polar solution to obtain a first mixture, and heating the first mixture to obtain a first lead halide solution;
    step 2, mixing a cesium salt with an octadecene and oleic acid to obtain a second mixture, and heating the second mixture to obtain a cesium oleate solution;
    step 3, mixing the first lead halide solution with a manganese halide to obtain a third mixture and heating the third mixture to 180° C., adding the cesium oleate solution to the third mixture, after 5 seconds, quenching the third mixture to room temperature, and thereafter centrifuging and precipitating the third mixture until intermediate quantum dots are dispersed in the non-polar solution, thereby to obtain an intermediate quantum dot non-polar solution;
    step 4, adding a second lead halide to the intermediate quantum dot non-polar solution to obtain target quantum dots, wherein halide ions contained in the second lead halide are different from the halide ions contained in the first lead halide;
    wherein the step 2 and the step 3 are performed under a vacuum condition.

2. The method of preparing the quantum dots according to claim 1, wherein the target quantum dots comprise at least one of Mn:$CsPbX_3$, Mn:$CsPb_2X_5$, and Mn:$Cs_4PbX_6$, wherein X is at least one of chlorine element, bromine element, and iodine element.

3. The method of preparing the quantum dots according to claim 1, wherein halide ions of the manganese halide are the same as halide ions of the first lead halide.

4. The method of preparing the quantum dots according to claim 1, wherein the cesium salt comprises at least one of cesium acetate, cesium carbonate, cesium nitrate, and cesium sulfate.

5. The method of preparing the quantum dots according to claim 1, wherein the surfactant comprises at least one of oleylamine, laurylamine, octylamine, and hexylamine.

6. The method of preparing the quantum dots according to claim 1, wherein the cosolvent comprises at least one of oleic acid, lauric acid, caprylic acid, caproic acid, acetic acid or methacrylic acid.

7. The method of preparing the quantum dots according to claim 1, wherein the non-polar solution comprises at least one of dodecane and octadecene.

8. The method of preparing the quantum dots according to claim 1, wherein the first preset temperature is 180° C., the predetermined period of time is 5 seconds, and the second preset temperature is room temperature.

9. The method of preparing the quantum dots according to claim 1, wherein the first lead halide in the step 1 is in a form of a solution.

10. The method of preparing the quantum dots according to claim 1, wherein the manganese halide in the step 3 is in a form of a solid.

11. The method of preparing the quantum dots according to claim 1, wherein the second lead halide in the step 4 is in a form of a solution.

12. The method of preparing the quantum dots according to claim 1, wherein the first lead halide is $PbCl_2$, the manganese halide is $MnCl_2$, and the second lead halide is $PbBr_2$.

13. The method of preparing the quantum dots according to claim 1, wherein the first lead halide is $PbBr_2$, the manganese halide is $MnBr_2$, and the second lead halide is $PbCl_2$.

14. The method of preparing the quantum dots according to claim 1, wherein the first lead halide is $PbCl_2$, the manganese halide is $MnCl_2$, and the second lead halide is $PbI_2$.

15. The method of preparing the quantum dots according to claim 1, wherein the first lead halide is $PbI_2$, the manganese halide is $MnI_2$, and the second lead halide is $PbCl_2$.

16. The method of preparing the quantum dots according to claim 1, wherein the first lead halide is $PbBr_2$, the manganese halide is $MnBr_2$, and the second lead halide is $PbI_2$.

17. The method of preparing the quantum dots according to claim 1, wherein the first lead halide is $PbI_2$, the manganese halide is $MnI_2$, and the second lead halide is $PbBr_2$.

18. The method of preparing the quantum dots according to claim 1, wherein the first lead halide is $PbCl_2$, the manganese halide is $MnCl_2$, and the second lead halide is a mixed solution of $PbBr_2$ and $PbI_2$.

* * * * *